United States Patent [19]
Wilson et al.

[11] Patent Number: 4,961,077
[45] Date of Patent: Oct. 2, 1990

[54] METHOD FOR AFFIXING INFORMATION ON READ-ONLY OPTICAL DISCS

[75] Inventors: Denney L. Wilson, Gastonia; Geoffrey A. Rhine, Shelby; Thomas L. Elmquist, Gastonia, all of N.C.

[73] Assignee: E. I. du Pont de Nemours and Company, Wilmington, Del.

[21] Appl. No.: 380,676

[22] Filed: Jul. 14, 1989

Related U.S. Application Data

[63] Continuation of Ser. No. 157,832, Feb. 19, 1988, abandoned.

[51] Int. Cl.⁵ .............................................. G01D 9/00
[52] U.S. Cl. .................................. 346/1.1; 346/76 L; 369/273
[58] Field of Search ...................... 346/1.1, 762, 135.1, 346/137; 358/297; 369/280, 282, 273, 274; 430/948

[56] References Cited

U.S. PATENT DOCUMENTS

| | | | |
|---|---|---|---|
| 4,066,268 | 1/1978 | Borchard et al. | 369/280 |
| 4,504,548 | 3/1985 | Esho | 346/135.1 |
| 4,580,146 | 4/1986 | Nakao | 346/76 L |
| 4,652,498 | 3/1987 | Wolf | 346/135.1 |

Primary Examiner—Mark J. Reinhart

[57] ABSTRACT

A read-only optical recording disc comprising a substrate, a metal reflective layer and an overlying protective layer, at least one of the substrate and the protective layer being light-transmissive, is marked by means of a pulsed scanning laser beam which transmits light in a patterned array through a transparent layer of the medium and indelibly marks the reflective layer of the medium without disrupting the surface continuity of the substrate and protective layer.

6 Claims, 1 Drawing Sheet

U.S. Patent    Oct. 2, 1990    4,961,077
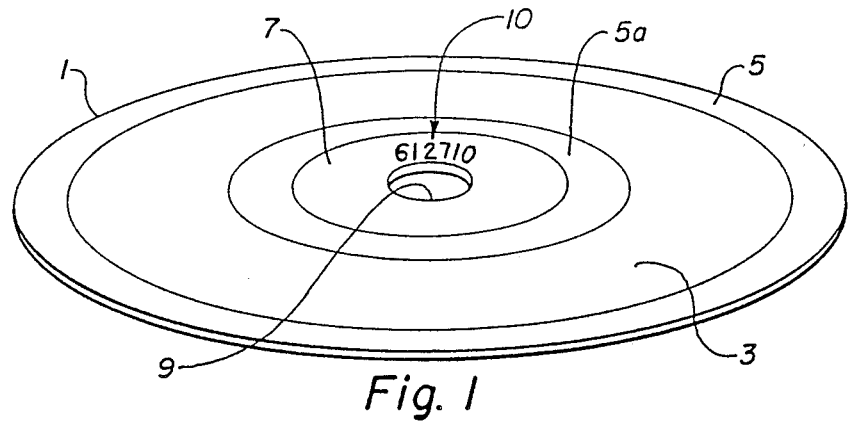
Fig. 1
Fig. 2
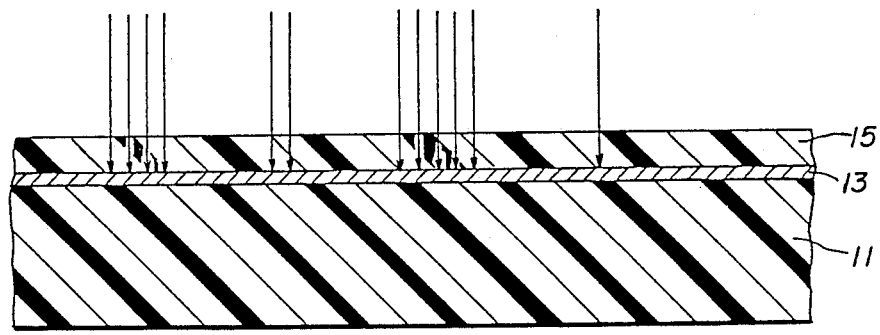
Fig. 3
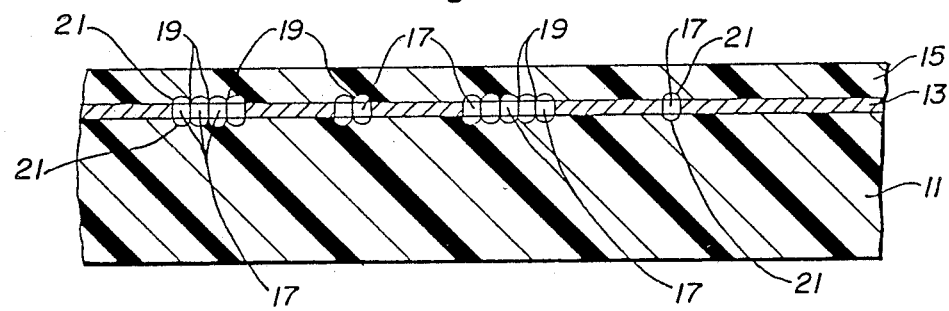

METHOD FOR AFFIXING INFORMATION ON READ-ONLY OPTICAL DISCS

This application is a continuation of application Ser. No. 07/157,832 filed 2/19/88 now abandoned.

Field of Invention

The invention relates to a method for affixing information characters on read-only optical discs and particularly to affixing information on finished optical discs in such manner that the characters can be read by the human eye or electronically and cannot be altered.

Background of the Invention

Read-only optical discs include CD-audio, CD-ROM, CD-interactive and CD-video discs, the basic structure of which is very similar. In particular, each of these four types of read-only media is comprised of a dimensionally stable substrate on which is coated a layer of light reflective metal protected by an overlying layer of organic polymer. Typically both the substrate and the protective layer are substantially transparent, but the disc is normally read through the substrate side. The substrate is of sufficient thickness to serve as a defocussing layer for the read beam.

Read-only media of the kind described above are made by a complex sequence of steps in which:

(1) The substrate is formed and digital or analogue information is impressed in the substrate by action of a metal stamper in an injection molding or injection compression molding apparatus. A single stamper can be used to impress several thousand discs;

(2) The side of the substrate bearing the information is coated with a substantially continuous layer of a reflective metal such as aluminum, which is usually applied by sputtering, or silver;

(3) A protective layer of polymer, such as nitrocellulose, is applied to the metal coating layer: and (4) Label information is printed on the protective layer by either transfer or screen printing.

Frequently, it is desired that the disc contain information which must be capable of being read by the human eye or by a conventional optical character reader and yet must be permanent in the sense that it cannot be altered or obscured without obvious damage to the disc. Since such information cannot be affixed to either the impressed information areas or the label areas of the disc, they must be placed in the non-informational areas of the disc such as the clamping area or in the annuli on both sides of the impressed information area(s) of the disc. Such non-impressed information includes such things as serial numbers, lot numbers, logos, vendor identification, distributor information, decorative patterns, names, bar codes, signatures, volume and issue numbers, edition numbers, dates and the like.

Readable information can easily be applied to the exterior non-information surfaces of the substrate or protective layer by such methods as printing. However, because the labeling or patterns are on the surface of the disc, they are susceptible to damage and alteration and they can be removed too easily.

A most permanent way of affixing such information to the disc is to impress it into the disc during the injection molding operation. However, this presents two problems. Firstly, since stampers may be used to make thousands of discs, the information must be applicable to all of the discs impressed by that particular stamper. Thus, serializations such as lot numbers, serial numbers, vendor identification, dates and the like cannot be added by a fixed stamper impression because they may not be applicable to all the discs produced by that stamper. Secondly, even if the injection molding apparatus is equipped with means for serialized impression by which, say, a serial number can be impressed into each disc, any discs which are rejected for any reason downstream of the molding process will cause gaps in the serial number sequence. Thus serial information is better added after the disc is fully manufactured.

Before now, there has been no really satisfactory way of adding ad hoc information to finished read-only disc media in such manner that it was both readable by the human eye and/or by conventional optical character readers and indelible in the sense that it was permanent and for all practical purposes unalterable without obviously damaging the disc medium.

Summary of the Invention

The invention is therefore directed to a method for affixing an internal pattern of visible information upon the non-information areas of a read-only optical disc where the disc structure is comprised of (a) a continuous substrate layer, (b) a substantially continuous layer of reflective metal, and (c) an overlying continuous polymeric protective layer, at least one of (a) and (c) being substantially light transmissive, which comprises passing a patterned sequence of pulsed laser light through a transparent layer at a power level sufficient to form a series of holes in the reflective metal layer corresponding to the information pattern without disrupting the surface continuity of either of layers (a) and (c).

Brief Description of the Drawing

The Drawing consists of three figures of which FIG. 1 is an orthographic representation of a read-only optical disc containing information by the method of the invention; FIG. 2 is a schematic cross-section of an optical disc illustrating the writing of the method of the invention; and FIG. 3 schematic cross-section of the same optical disc on which information has been written by the method of the invention.

Definitions

The term "visible pattern" means that the pattern can be readily discerned by the naked human eye or by an ordinary optical character reader.

The term "non-information area" refers to those areas of the optical disc which do not contain impressed data and are therefore blank, or areas which, when read by a read laser beam, translate to a zero digital signal.

The term "light transmissive" as applied to the substrate and protective layers, means that either one in conjunction with the metal layer is capable of transmitting out at least 70% of the total light input from the writing laser at whatever wavelength it may be.

The term "transparent" refers to the fact that visible light can pass through the layer in question and that an observer can see through the layer.

Detailed Description of the Invention

A. Disk Configuration and Composition

The specifications for read-only optical discs are covered by European Computer Manufacturing Association (ECMA) Standards 119 and International Standards Organization (ISO) Standards DIS 9660. Discs meeting these standards are suitable for use in practicing the method of the invention.

The substrate for CD-audio discs and other read-only optical discs is a transparent polymeric material of 120 mm diameter and 1.2 plus or minus 0.1 mm thickness. The disc is read by passing a laser read beam through the substrate and detecting differences in the diffusion and/or reflection of the light as the disc is rotated beneath the laser beam.

The substrate material can be selected from a wide variety of materials having a double pass reflection and transmission of greater than 70%. Suitable substrate materials include polycarbonate, polymethylmethacrylate and other polymeric materials. So long as the substrate material meets the criteria for read-only optical discs, they are suitable for use in the method of the invention.

Substrates can be formed by such processes as injection molding, injection-compression molding, laminating or casting. The digital information of read-only optical discs is impressed in the disc by molding under heat and pressure using an appropriate mold or stamper. When the disc is made by injection molding or injection compression molding, the digital information is compressed contemporaneously with formation of the disc.

It will also be recognized that the substrate, in conjunction with the protective layer, serves as a barrier which prevents environmental damage to the reflective layer. Thus the inherently continuous nature of the substrate is essential for protecting the metal layer from humidity and other damaging environmental conditions which the disc may be subjected to.

The reflective layer on the information-carrying surface of the substrate must, of course, have sufficient reflectivity so that the overall reflectivity of the laser read beam is above 70% (plus or minus 3%). Among the suitable metals for this purpose are Al, Pt, Au, Ag, Cu, Ni, Ag and various alloys of these materials. Such metal layers may be deposited by such means as vapor deposition, sputtering, electroless plating and electroplating. The particular method of application which may be chosen depends on the metal and the economics of the method vis-a-vis the metal of choice. Regardless of the method of application, the metal reflective layer will be substantially continuous in character.

The precise degree of continuity of the metal layer is critical only to the extent the required degree of signal reflectivity must be obtained. Thus the layer need not be absolutely continuous and smooth, but can be porous and contain holes. As an illustration of suitably continuous layers, sputtered layers of aluminum are most frequently used in commercial CD-audio discs. The metal layers for such discs when examined at 100× magnification appear porous, and small areas of substrate can be seen through the layer. On the other hand, electroplated layers of metals such as Au and Ag are relatively non-porous and essentially completely continuous. Thus the term "substantially continuous" as used herein with respect to the reflective layer refers to sufficient layer continuity to provide the required degree of reflectivity and transmissitivity of light back through the substrate.

The primary purpose of the protective layer, as implied by its name, is to protect the underlying reflective layer and the information impressed in the substrate from both mechanical and environmental damage. The protective layer is ordinarily a thin continuous layer of polymer such as nitrocellulose or UV-cured acrylates which when applied as a continuous film will render the disc structure hermetic. That is, so long as the disc is not damaged, the reflective layer will not be subject to conditions of humidity and other environmental conditions to which discs might be subjected. The thickness of the protective layer in conventional read-only discs is currently about 0.1-0.3 mm. However, from the standpoint of theoretical operability as well as practical, the protective layer might well be thicker. To perform this function adequately, it is, of course, essential that the layer be impervious to environmental factors and therefore it is also essential that the outer surface of the protective layer not be in any way disrupted. Because read-only media of the type described here are read through the substrate, it is not necessary that the protective coating be transparent or have any specified optical properties. However, transparent polymers may be chosen and are chosen frequently because of their esthetics.

It will be recognized that the wavelength of the laser beam used in the method of the invention must be chosen so that it is substantially absorbed by the reflective metal layer. Thus, when the disc is read by, for example, a semiconductor laser, the metal layer is substantially reflective of the laser read beam, but when it is written upon in the manner of the invention, it is substantially absorptive of the laser marking beam.

In addition, it has been found that a pulsed laser beam is much more effective for use in the method of the invention than a continuous wave laser beam. In particular, the pulsed laser light gives much better defined marking and can be operated at a higher power level before disruption of the protective layer becomes a serious problem.

B. Mark Formation

The mechanism of mark formation in the method of the invention is not completely understood. However, the physical character of the mark gives a possible clue. Examination of the marks created by the invention at 5× magnification reveals that the image areas are comprised of an array of intersecting holes extending through the metal layer separated by areas which appear as opaque dots. These small dots are probably dislocated quantities of residual metal and polymer from the substrate and protective layers. Further examination of the marks reveals that both interfaces of the substrate and protective layers with the metal layer are disrupted and in some instances the outer surface of the thin protective layer is bowed upward but not broken. It appears, therefore, that the metal is melted and some of the polymer content of the adjacent layers is volatilized. From this it seems likely that the aluminum in the image areas of the laser becomes fluid and is forced away from the center of the target areas by a combination of photon pressure, vapor pressure and surface tension.

Be that as it may, the exact medium of mark formation is not critical so long as the power level of the marking laser is not so high as to cause so much volatilization of the polymeric layers that the surface of either one of them is disrupted. That is, the continuity of the layer is not broken so as to make the metal layer accessible to humidity and other environmental conditions. From what little is understood about mark formation, it is nevertheless clear that the power level of the writing laser must not be so high as to cause disruption of the outer surface of either the protective layer or the substrate layer. When both layers are transparent, it is preferred to carry out the method of the invention through the thinner of the layers. By this means the power level of the laser becomes less critical and small deviations are less likely to incur disruption of the surface of either layer. Thus in conventional CD audio discs in which the protective layer is of a thickness on the order of 0.1–0.3 mm and both layers are transparent, it is preferred to carry out the invention by laser light transmission through the protective layer. Nevertheless the method can be carried out successfully through whichever layer is transparent or either layer if both are properly light-transmissive.

It will be noted also that when both the substrate and protective layer are transparent to visible light, an observer of the pattern affixed in the disc by the method of the invention is actually looking completely through the disc.

Description of the Drawings

FIG. 1 is an orthographic view of a CD-audio disc in the interior of which serial information has been affixed by the method of the invention. The circular disc 1 contains information area 3 on which digital information has been impressed by injection molding. Areas 5 and 5a are respectively outer and inner annular disc areas on which no information has been impressed. Area 7 is the clamping area of the disc which contains no information and area 9 is the center hole of the disc. A serial number 10 has been affixed by the method of the invention and is visible in the clamping area 7.

FIG. 2 is a schematic cross-section of a non-information area of a finished read-only disc which is comprised of a polycarbonate resin substrate 11, an aluminum reflective layer 13 and an overlying nitrocellulose protective layer 1. The arrows indicate the path of laser light in the areas which are to be written on by the method of the invention.

FIG. 3 shows schematically the results of marking on the non-information areas of the disc. In particular, the areas of information affixed by the method of the invention show a matrix of intersecting holes 17 having areas of solids 19 between the holes 17 and areas 21 in which the polymer layers 11 and 15 have been disturbed but not in such manner that the outer surface of either of the polymer layers has been disrupted.

EXAMPLES

Example 1

A standard commercially made CD-audio disc having a bisphenol A polycarbonate resin* substrate, sputtered aluminum reflective layer and nitrocellulose protective layer was positioned substrate-down in the writing chamber of a Comet YAG laser marking system manufactured by Quantrad Corporation, Torrence, Calif. The computer control of the system was programmed to print a serial number of six characters in the clamping area of the disc by passing a pulsed laser beam through the protective layer of the disc. The characters had a height of 0.1 inch. A power setting of 65% was used to mark the serial number in the metal
laser speed (traverse rate) was 1800 inches per second with a spot density of 1.

Though small areas of the internal interface of the polymer layers with the metal layer were disrupted, the letters were nevertheless quite precisely defined and the surfaces of neither of the polymer layers was disrupted.

Upon looking downward through the disc at the affixed numbers under 5× magnification, the marked areas appeared as a series of intersecting circular holes with very small dark dots interspersed in the interstitial spaces between the circular holes.

*Resin CD 2000, manufactured by Mobay Chemical Corp., Pittsburgh, Pa., U.S.A.

Examples 2–10

Using the same procedure as Example 1, a series of standard CD audio discs was marked with a six digit serial number at various power levels to observe the effect of power level on the efficacy of the marking process. The results are given in Table 1 below:

TABLE 1

Effect of Pulsed Laser Power Level on Marking

| Example No. | Power Level | Mark Characteristics |
|---|---|---|
| 2 | 60% | No discernible mark |
| 3 | 65 | Clear, well defined mark, no change in protective layer surface |
| 4 | 70 | Clear, well defined mark, surface of protective layer raised slightly |
| 5 | 75 | Mark somewhat ragged, more pronounced raising of protective layer surface |
| 6 | 80 | Mark ragged, surface of protective layer roughened |
| 7 | 85 | Mark ragged, surface of protective layer roughened |
| 8 | 90 | Mark very ragged, surface of protective layer roughened and substrate layer darkened |
| 9 | 95 | Mark more ragged, poor character definition, protective layer very rough and substrate fogged as well as darkened |
| 10 | 100 | Mark very ragged, both protective layer and substrate fogged and surface of substrate is roughened somewhat. |

These data shown the adverse effects of using too much or too little laser power in the method of the invention. In particular, for this laser, about 65% power was needed to get satisfactory marking, but the use of over about 80% resulted in excessive disruption of the protective layer. At 100% power, even the substrate surfacer was affected.

Examples 11–12

Using the same procedure as in the previous Examples, two standard CD discs were marked using a continuous wave laser beam instead of a pulsed beam. The results are given in Table 2 below:

TABLE 2

Continuous Beam Marking

| Example No. | Power Level | Mark Characteristics |
|---|---|---|
| 11 | 65% | Marks were light and uneven, could not be seen clearly from substrate side, no roughening of surface of protective layer |
| 12 | 70 | Marks were varied in clarity and appeared to be distorted, appearance from substrate side almost same as protective layer side, which was slightly roughened |

These data show that the use of a continuous wave laser beam is significantly less effective than a pulsed laser beam of comparable power. For this reason, it is much preferred to use a pulsed laser beam in practicing the method of the invention.

We claim:

1. A method for affixing an internal pattern of visible information which is readable by the naked human eye upon the non-information areas of a read-only optical disc where the disc structure is comprised of (a) a continuous substrate layer, (b) a substantially continuous layer of reflective metal, and (c) an overlying continuous polymeric protective layer, at least one of (a) and (c) being substantially light-transmissive, which comprises passing a patterned sequence of pulsed laser light through a transparent layer at a power level sufficient to form a series of holes in the underlying reflective metal layer corresponding to the information pattern without disrupting the surface continuity of either of layers (a) and (c).

2. The method of claim 1 in which both of layers (a) and (c) are light-transmissive and the disc is transparent through its entire thickness in the pattern areas.

3. The method of claim 2 in which the protective layer is thinner than the substrate layer and the patterned sequence of pulsed laser light is passed through the protective layer.

4. The method of claims 1-3 in which the substrate layer is a polycarbonate resin.

5. The method of claims 1-3 in which the protective layer is nitrocellulose.

6. The method of claims 1-3 in which the reflective metal layer is aluminum.

* * * * *